3,402,596
LEAK DETECTION SYSTEM
George N. Woodruff, Merritt Island, Fla., assignor to TRW Inc., Redondo Beach, Calif., a corporation of Ohio
Filed Jan. 31, 1967, Ser. No. 613,000
5 Claims. (Cl. 73—40.7)

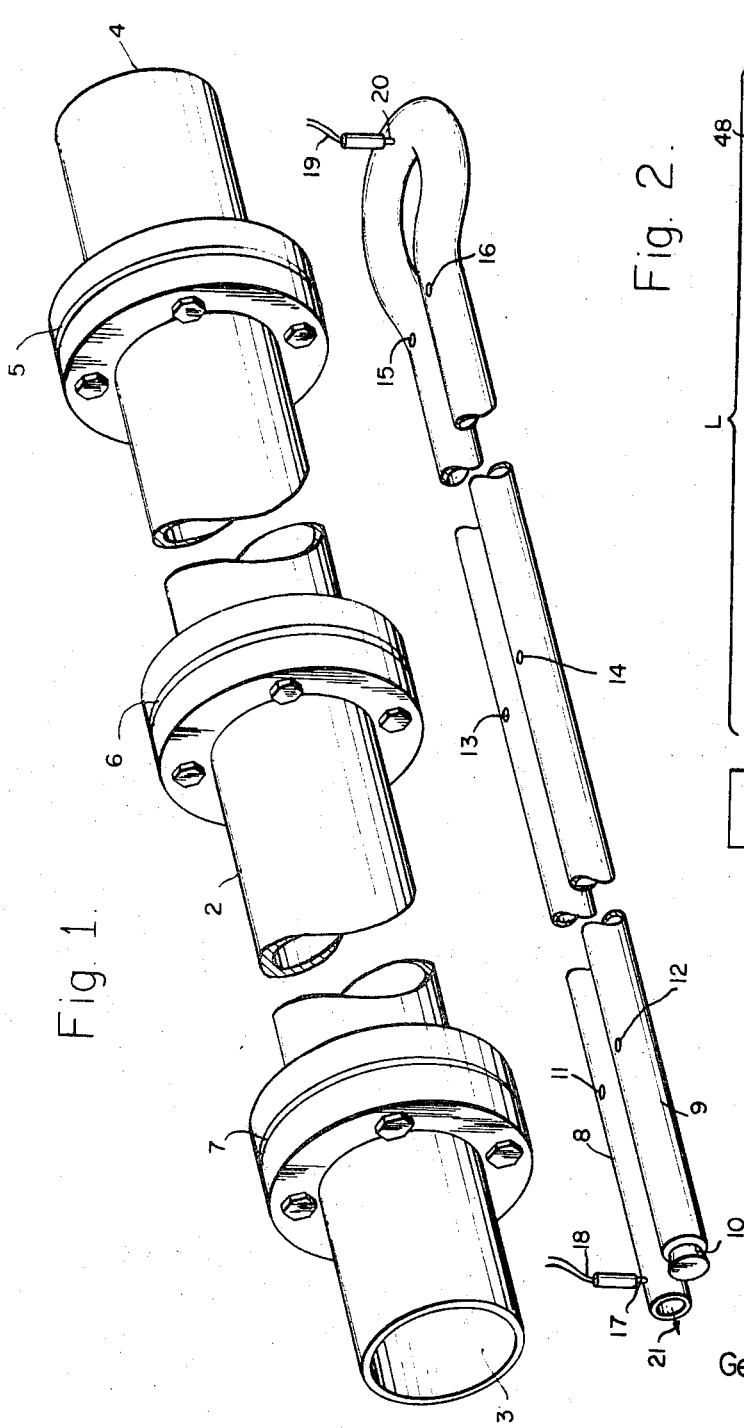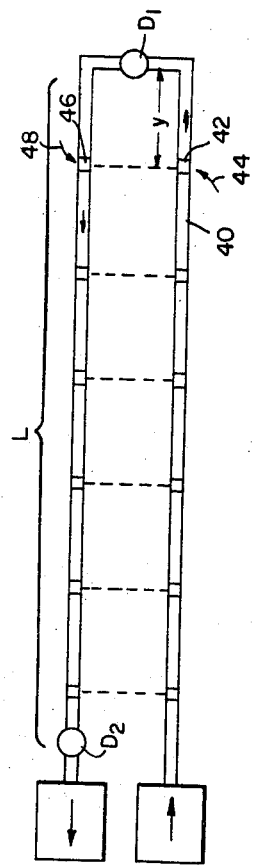

ABSTRACT OF THE DISCLOSURE

To determine the location and magnitude of a gas leak, parallel conduits are provided which extend throughout the area to be monitored or along the pipeline. The conduits are arranged in the form of a closed loop and maintained at a pressure below ambient by a vacuum pump connected to one end of the loop. At intervals along the conduits, leaks are provided in each leg of the loop which serve to introduce air and the gas to be detected into the loop. One or more detectors, sensitive to the gas or vapor to be monitored are provided, and the location of a leak which introduces gas into the loop is determined by measuring the time intervals between detector activity. The magnitude of the leak is determined by the activity of the detector.

Background of the invention

Prior art in detection and monitoring extensive areas or long lines for flammable or toxic vapors relies heavily on the use of many detector elements around the area or along the pipe or, alternatively, on the use of a portable detector which is physically transported to monitor activity at various points. The former method is quite expensive in terms of the equipment involved, while the latter method does not provide continuous monitoring of single points over a period of time. Other disadvantages of the prior art include exposing the detection elements to atmospheric conditions which may be harmful, and for many detection elements the possibility of monitoring interfering gases or vapors other than the desired ones.

Brief summary of the invention

The invention may be summarized as a vapor location, detection, and monitoring system having parallel conduits connected at one end so as to form a closed loop. Air, and if present, the gas to be detected are introduced into the conduits by leaks in each of the parallel conduits, by virtue of maintaining the pressure inside the conduits below ambient. If gas is introduced into the conduits, it will be detected by one or more detection elements mounted in the conduit. The location of the leak may be determined by measuring the time intervals between the activation of two or more detectors or by the change in activity level of a single detector. The magnitude of the leak may be determined by measuring the activity of one or more detectors.

Brief description of the several views of the drawing

FIGURE 1 is a view partially broken away at leak detector system constructed according to this invention, and FIGURE 2 is a schematic view illustrating the operation of the invention.

Description of the preferred embodiments

Referring to FIGURE 1, a portion 2 of a conduit or pipeline is shown which for purposes of illustration may contain a gas or liquid. Typically, fluid would enter the line at 3 and leave the line at 4. Openings 3 and 4 have connections, pumps, tanks, or the like. An example of fluid is gaseous or liquid hydrogen such as would be transported in a fluid delivery system for rocket engines. Flanged connections are shown at 5, 6, and 7, which are typical and are shown here since such connections represent the most probable leak points in a piping system.

The vapor detection system which includes tubes 8 and 9 is shown adjacent the pipeline. The open end of tube 8 is connected to a vacuum pump so that the pressure in conduits 8 and 9 is maintained below ambient. The end of tube 9 is closed by means such as plug 10. The direction of gas flow is shown by arrow 21.

Conduits 8 and 9 are provided with a number of paired small holes such as 11 and 12, 13 and 14, and 15 and 16. Three pairs are shown for illustrative purposes only and in practice, any number of paired holes may be used, the constraint being that the distance between adjacent pairs is limited by the response time of the system and detector. Furthermore, instead of employing apertures, the conduits may have selected portions rendered permeable to a selected fluid or fluids.

Should a leak occur in gas line 2, for example at flange 7, gas vapor escaping will be drawn into conduits 8 and 9 through the orifices 11 and 12, and would proceed toward the exit of conduits 8 and 9 as shown by arrow 21. The gas entering orifice 11 would reach detector 17 and cause a signal to be given through the detector output lead 18. Since orifice 12 is at a further distance from detector 20, this detector will sense the presence of gas which entered orifice 12 at some later time causing a signal to be given through lead 19.

At still some later time, the gas which is entering orifice 12, diluted by the air entering orifices 14, 16, 15, and 13 will pass orifice 11 and the concentration of gas in air will be increased. When this mixture reaches detector 17, a signal will be given off through lead 18. The relative time difference between the signals provided by detectors 17 and 20 with respect to time, permit accurate location of the point at which gas entered the system.

Another embodiment of this device would employ only one detector, 17, eliminating detector 20 from the system. In this case, gas entering the system due to a leak at flange 7, for example, would cause a signal to be given from detector 17 at some early time since orifice 11 is closest to detector 17.

Gas entering the system through orifice 12 would travel around the loop until it reaches orifice 11. Gas entering orifice 11 would cause an increase in the gas concentration. This increased gas concentration reaching detector 17 would cause a change in the signal level given from detector 17. The time between the appearance of the first signal from detector 17 and the appearance of the higher level signal can be used to determine the leak location.

Referring to FIGURE 2, a schematic of the device is illustrated and the following example is given for calculating the location of a leak. Assuming gas enters line 40 at point 42, as shown by arrow 44, the distance between point 42 and detector $D_1$ is equal to $y$. The distance from detector $D_1$ to detector $D_2$ is $L$. At the same time, gas will enter aperture 46 in the direction of arrow 48. Gas entering at point 42 will be detected by detector $D_1$ at a time given by the following equation:

$$t = Y/v$$

where:

$t$ = time,
$y$ = distance from the aperture to detector $D_1$,
$v$ = average velocity of the sweep gas.

The gas which enters the other leg of the loop at point 46 will be detected by detector $D_2$ at a time given by the following equation:

$$t_2 = \frac{L - 2y}{v}$$

where:

$t_2$=time difference between actuation of detectors $D_1$ and $D_2$,
$L$=the distance between detectors $D_1$ and $D_2$,
$y$=distance between aperture 42 and detector $D_1$, and
$y$=distance between aperture 42 and detector $D_1$, and equal to the distance between $D_1$ and 46,
$v$=average velocity of the sweep gas.

Accordingly, the distance $y$ from the leak to the first detector is determined by the following equation:

$$y = \frac{L - t_2 v}{2}$$

Thus, by measuring the time difference $t_2$ and knowing L and $v$, the location is readily determined. It can be readily appreciated that the velocity of the sweep gas can be determined by such means a flowmeters.

While the invention has been described with reference to determining leaks from a fluid line, it is readily apparent that the presence of gas (or other fluids) can be determined without reference to the existence of fluid carrying conduits. Accordingly, the monitoring system can be placed where desired to determine the location and quantity of pollutants.

Thus, it can be seen that by this invention, the location of a leak in a system can be readily determined by using only two detectors and by providing a predetermined velocity in the system which will accurately indicate the leakage. The predetermined velocity can be ascertained by any conventional means such as the flowmeter.

What is claimed is:

1. A fluid leak detection and locating system located within an environment which is subject to exposure to a leaking fluid from a fluid source which comprises:
    a first conduit, said conduit having along its length thereof at closely adjacent fixed intervals, means to allow the entry of fluid therein,
    a second conduit, said second conduit being arranged over a substantial portion of its length contiguous to first conduit,
    said second conduit likewise being provided at fixed intervals along its length with means to allow fluid entry therein,
    said first and second conduits being connected to each other at one end thereof,
    means to draw gas through said first and second conduits in a predetermined direction and velocity at a pressure less than pressure outside of said conduits whereby said leaking is fluid drawn through said fluid entry means in said conduits,
    at least one detector exposed to the interior of at least one of said conduits, said detector being responsive to the presence of said leaking fluid,
    means for measuring the time intervals between increased outputs of said detector due to increased concentration of said leaking fluid in said conduits,
    whereby the location of said leak can be determined.
2. A fluid leak detection and locating system according to claim 1 and further including a second detector,
    said second detector being exposed to the interior of the other of said conduits and means for measuring the time intervals between detector actuations.
3. A fluid leak detection and locating system according to claim 2 wherein one of said leak detectors is located at the connected ends of said first and second conduits and the other detector is located at the other end of one of said conduits, said other end being located adjacent the means to draw gas through said conduits.
4. A fluid leak detection and locating system according to claim 1 wherein said means to allow fluid entry in said conduit comprises apertures.
5. A fluid leak detector and locating system according to claim 1 wherein said means to allow fluid entry in said conduit comprises materials of permeable construction in said conduits.

References Cited

UNITED STATES PATENTS

| | | | |
|---|---|---|---|
| 1,358,778 | 11/1920 | Payne | 73—40.5 |
| 3,191,427 | 6/1965 | Rapson | 73—40.5 |

S. CLEMENT SWISHER, *Acting Primary Examiner.*

JEFFREY NOLTON, *Assistant Examiner.*